(12) United States Patent
Shteynberg et al.

(10) Patent No.: US 8,803,443 B2
(45) Date of Patent: *Aug. 12, 2014

(54) CURRENT REGULATOR FOR MULTIMODE OPERATION OF SOLID STATE LIGHTING

(75) Inventors: Anatoly Shteynberg, San Jose, CA (US); Harry Rodriguez, Gilroy, CA (US)

(73) Assignee: Point Somee Limited Liability Company, Dover, DE (US)

( * ) Notice: Subject to any disclaimer, the term of this patent is extended or adjusted under 35 U.S.C. 154(b) by 598 days.

This patent is subject to a terminal disclaimer.

(21) Appl. No.: 12/940,257

(22) Filed: Nov. 5, 2010

(65) Prior Publication Data

US 2011/0115411 A1  May 19, 2011

Related U.S. Application Data

(63) Continuation of application No. 11/701,774, filed on Feb. 2, 2007, now Pat. No. 7,852,300.

(60) Provisional application No. 60/764,846, filed on Feb. 6, 2006.

(51) Int. Cl.
| | |
|---|---|
| *G05F 1/00* | (2006.01) |
| *H05B 37/02* | (2006.01) |
| *H05B 39/04* | (2006.01) |
| *H05B 41/36* | (2006.01) |
| *G03B 15/03* | (2006.01) |

(52) U.S. Cl.
USPC .......................................... 315/297; 396/155

(58) Field of Classification Search
None
See application file for complete search history.

(56) References Cited

U.S. PATENT DOCUMENTS

| | | | | |
|---|---|---|---|---|
| 5,949,198 | A * | 9/1999 | Nakamura et al. | 315/307 |
| 7,130,468 | B1 | 10/2006 | Meyer | |
| 2005/0218838 | A1* | 10/2005 | Lys | 315/291 |
| 2006/0038506 | A1* | 2/2006 | Rose et al. | 315/247 |
| 2007/0080652 | A1* | 4/2007 | Elferich et al. | 315/291 |
| 2007/0267978 | A1 | 11/2007 | Shteynberg | |
| 2008/0116818 | A1 | 5/2008 | Shteynberg | |

* cited by examiner

*Primary Examiner* — Douglas W Owens
*Assistant Examiner* — Dedei K Hammond
(74) *Attorney, Agent, or Firm* — Christensen O'Connor Johnson Kindness PLLC

(57) ABSTRACT

A representative apparatus embodiment provides a plurality of operating modes for solid state lighting, such as a flash mode and a constant or background lighting mode for use with devices such as cameras. A representative apparatus comprises a memory adapted to store a plurality of average current parameters; and a controller adapted to modulate an energizing cycle time period ("T") for providing power to the solid state lighting as proportional to the product of the selected average current parameter ("a") and a reset time period ("$T_R$") for an inductor current to return to a substantially zero level from a predetermined peak level ($T \propto a \cdot T_R$). The average current parameter is predetermined as substantially proportional to a ratio of a peak inductor current level ("$I_P$") to an average output D.C. current level ("$I_O$")

$$\left( a \propto \frac{I_P}{I_O} \right).$$

40 Claims, 5 Drawing Sheets

FIG. 5

CURRENT REGULATOR FOR MULTIMODE OPERATION OF SOLID STATE LIGHTING

CROSS-REFERENCE TO RELATED APPLICATIONS

This application is a continuation of and claims priority to U.S. patent application Ser. No. 11/701,774, filed Feb. 2, 2007, now U.S. Pat. No. 7,852,300, inventors Anatoly Shteynberg et al., entitled "Current Regulator for Multimode Operation of Solid State Lighting," which application further claims priority to and is a nonprovisional of U.S. Provisional Patent Application Ser. No. 60/764,846, filed Feb. 6, 2006, inventors Anatoly Shteynberg et al., entitled "Flash LED Driver," which are commonly assigned herewith, the contents of which are incorporated herein by reference, and with priority claimed for all commonly disclosed subject matter.

BACKGROUND

A wide variety of LED drivers or regulators are known for use in providing flash lighting for cameras. For example, Semtech (SC4501 data sheet) provides current control, but requires external loop compensation and restricts the dynamics of the converter. Such a current regulator is also analog, not digital, and requires many components which compromise the efficiency of the regulator. Such decreased efficiency requires excessive power consumption which is highly detrimental for portable, battery-operated applications, such as for use in cameras and mobile telephones.

Prior art LED drivers generally have very low efficiency, making them highly unsuitable for applications in portable devices such as cameras and mobile telephones. For example, in U.S. Pat. No. 6,317,566, an electronic flash device uses current supplied from a battery through a current-limiting resistor, increasing power dissipation and rendering the device very inefficient. It is also a complex device, using many components, including using a three-winding transformer for functional needs when isolation is not achieved.

Similarly, in U.S. Patent Publication No. 2005/0265709, current is also supplied through a resistor to the LEDs of a camera flash, in either a continuous low current mode or a temporary high current mode, also thereby increasing power dissipation and making this device quite inefficient.

Lastly, in U.S. Pat. No. 7,136,672, current is also supplied through selectable resistors to the LEDs of a camera flash, used with a camera of a mobile telephone. The LEDs utilized emit red, green, and blue (RGB) light, and are connected to ground via a switch and a resistor, with different resistor values utilized to adjust current levels through the LEDs. Again, such use of current-limiting resistors serves to increase power dissipation and render the resulting device considerably less power efficient.

Accordingly, a need remains for a driver circuit or current regulator for solid state lighting which can provide multiple modes of operation, such as for supplying power to light-emitting diodes utilized for flash or background lighting in cameras and other portable devices. Such a current regulator should provide digital control, without requiring external compensation. Lastly, such a current regulator should utilize comparatively fewer components, providing reduced cost and size, while simultaneously increasing its efficiency and enabling longer battery life when used in portable devices.

SUMMARY

The representative embodiments of the present disclosure provide numerous advantages for supplying power to solid state lighting such as light-emitting diodes. The representative embodiments allow multiple modes of operation, such as for supplying power to LEDs utilized for flash or background lighting in cameras and other portable devices. The representative current regulator embodiments provide digital control, without requiring external compensation. The representative embodiments do not utilize resistive impedances in the current path to the LEDs, resulting in appreciably lower power losses and increased efficiency. The representative current regulator embodiments also utilize comparatively fewer components, providing reduced cost and size, while simultaneously increasing efficiency and enabling longer battery life when used in portable devices.

A first representative current regulator embodiment provides a plurality of operating modes for solid state lighting, with the current regulator being couplable to a DC power supply, such as a battery. The representative current regulator comprises: a memory adapted to store a plurality of average current parameters and a control circuit coupled to the memory, the control circuit adapted to modulate an energizing cycle time period for providing power to the solid state lighting in response to a selected average current parameter of the plurality of average current parameters.

In representative embodiments, each average current parameter of the plurality of average current parameters corresponds to a selected operating mode of the plurality of operating modes, such as a flash mode and a constant mode.

The control circuit, in representative embodiments, is further adapted to determine the energizing cycle time period ("T") as proportional to the product of the selected average current parameter ("a") and a reset time period ("$T_R$") for an inductor current to return to a substantially zero level from a predetermined peak level ($T \propto a \cdot T_R$). Each average current parameter ("a") of the plurality of average current parameters may be predetermined as substantially proportional to a ratio of a peak inductor current level ("$I_P$") to an average output DC current level ("$I_O$")

$$\left( a \propto \frac{I_P}{I_O} \right),$$

or more particularly, as substantially equal to one-half of a ratio of a peak inductor current level ("$I_P$") to an average output DC current level ("$I_O$")

$$\left( a \approx \frac{I_P}{2 I_O} \right).$$

Generally, the peak inductor current level ($I_P$) and the average output DC current level ($I_O$) are predetermined and correspond to a selected operating mode of the plurality of operating modes.

In representative embodiments, the control circuit may further comprise: a first counter to provide a count corresponding to the energizing cycle time period ($T_n$) and a second counter to provide a count corresponding to the reset time period ($T_R$). The control circuit may be further adapted to provide a next energizing cycle when a count $T_n$ of the first counter is equal to the energizing cycle time period T.

The representative current regulator also may further comprise: an inductor coupled to the DC power supply and coupled to the solid state lighting (typically via a diode); a switch coupled to the inductor and to the control circuit; a current sensor coupled to the switch; and a first comparator coupled to the current sensor and the control circuit; wherein the control circuit is further adapted to turn the switch on to commence an energizing cycle and to turn the switch off when the first comparator indicates that an inductor current has reached a predetermined peak level. In addition, the representative current regulator also may further comprise a voltage sensor and a second comparator coupled to the voltage sensor and to the control circuit, wherein the control circuit is further adapted to determine the reset time period ($T_R$) when the second comparator indicates that a voltage level corresponding to the inductor current has decreased substantially to a zero level.

Representative embodiments also include a method of providing power to a solid state lighting system for a selected operating mode of a plurality of operating modes. A representative method comprises: starting an energizing cycle by providing current through an inductor until a predetermined peak inductor current level is reached; transferring energy stored in the inductor to the solid state lighting; determining a reset time period as a time duration for the inductor current to decrease substantially to a zero level from the peak inductor current level; determining an energizing cycle time period based on the reset time period and a predetermined average current parameter; and commencing a next energizing cycle when the energizing cycle time period has elapsed.

In the representative method, the determination of the energizing cycle time period further comprises determining the energizing cycle time period ("T") as proportional to the product of the predetermined average current parameter ("a") and a reset time period ("$T_R$") for an inductor current to return to a substantially zero level from a predetermined peak level ($T \propto a \cdot T_R$). The predetermined average current parameter ("a") also may be determined as substantially proportional to a ratio of a peak inductor current level ("$I_P$") to an average output DC current level ("$I_O$")

$$\left(a \propto \frac{I_P}{I_O}\right).$$

The predetermined average current parameter may be selected from a plurality of predetermined average current parameters, with each predetermined average current parameter corresponding to a selected operating mode of the plurality of operating modes, and may be determined by a corresponding peak inductor current level ($I_P$) of a plurality of peak inductor current levels ($I_P$) and an average output DC current level ($I_O$) of a plurality of and average output DC current levels ($I_O$).

Another representative embodiment includes an apparatus for providing a plurality of operating modes for solid state lighting, with the apparatus comprising: a memory adapted to store a plurality of average current parameters and a controller coupled to the memory, wherein the controller adapted to modulate an energizing cycle time period for providing power to the solid state lighting in response to a selected average current parameter of the plurality of average current parameters.

Yet another representative embodiment includes a current regulator for providing a plurality of operating modes for solid state lighting, with the current regulator couplable to a DC power supply. The representative current regulator comprises: an inductor coupled to the DC power supply and coupled to the solid state lighting; a switch coupled to the inductor; a current sensor coupled to the switch; a first comparator coupled to the current sensor; a voltage sensor coupled to the inductor; a second comparator coupled to the voltage sensor; a memory adapted to store a plurality of average current parameters; and a control circuit coupled to the memory and to the first and second comparators, the control circuit adapted to turn the switch on to commence an energizing cycle and to turn the switch off when the first comparator indicates that an inductor current has reached a predetermined peak level, to determine a reset time period when the second comparator indicates that a voltage level corresponding to the inductor current has decreased substantially to a zero level, and to determine an energizing cycle time period for providing power to the solid state lighting as proportional to a selected average current parameter of the plurality of average current parameters and the reset time period.

Numerous other advantages and features of the present disclosure will become readily apparent from the following detailed description of the disclosure and the embodiments thereof, from the claims, and from the accompanying drawings.

BRIEF DESCRIPTION OF THE DRAWINGS

The features of the present disclosure will be more readily appreciated upon reference to the following disclosure when considered in conjunction with the accompanying drawings, wherein like reference numerals are used to identify identical components in the various views, and wherein reference numerals with alphabetic characters are utilized to identify additional types, instantiations, or variations of a selected component embodiment in the various views, in which.

DETAILED DESCRIPTION

While the present disclosure is susceptible of embodiment in many different forms, there are shown in the drawings and will be described herein in detail specific representative embodiments thereof, with the understanding that the present disclosure is to be considered as an exemplification of the principles of the disclosure and is not intended to limit the disclosure to the specific embodiments illustrated. In this respect, before explaining at least one embodiment consistent with the present disclosure in detail, it is to be understood that the disclosure is not limited in its application to the details of construction and to the arrangements of components set forth above and below, illustrated in the drawings, or as described in the examples. Methods and apparatuses consistent with the present disclosure are capable of other embodiments and of being practiced and carried out in various ways. Also, it is to be understood that the phraseology and terminology employed herein, as well as the abstract included below, are for the purposes of description and should not be regarded as limiting.

Figure 1:
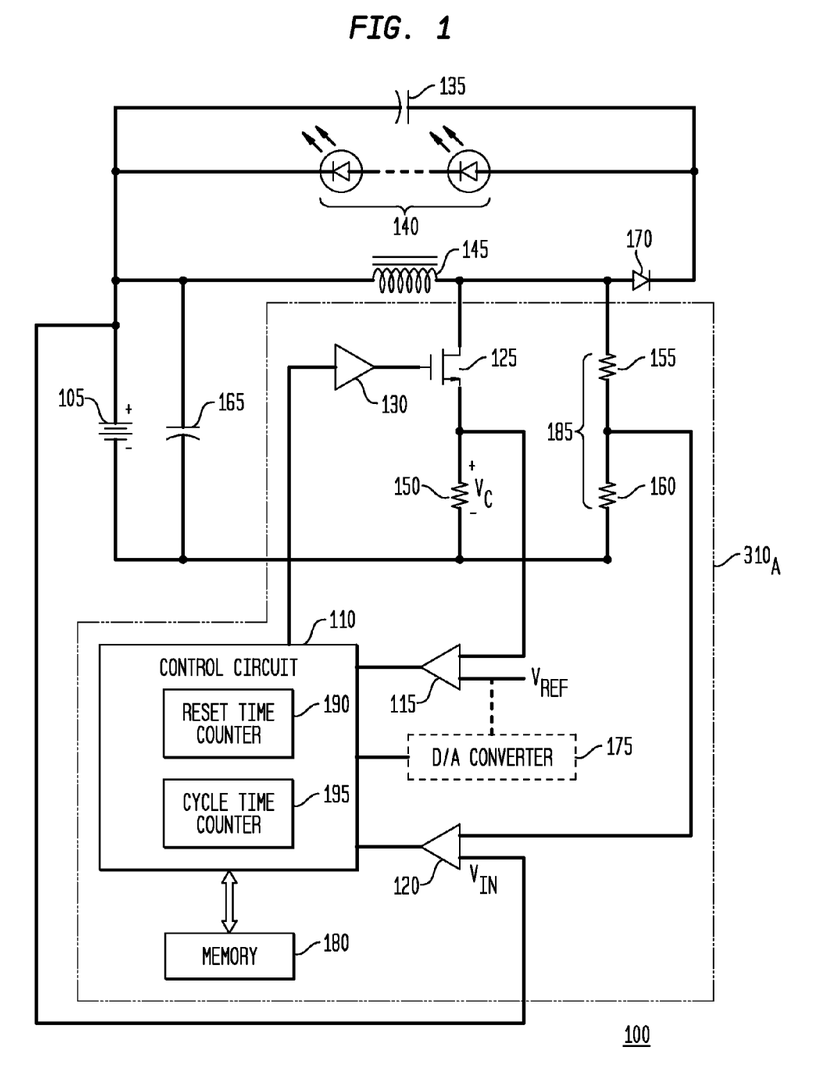
FIG. 1 is a circuit and block diagram of a representative first embodiment of a current regulator (or converter) in accordance with the teachings of the present disclosure.

FIG. 1 is a circuit and block diagram of a first representative embodiment of a current regulator (or converter) 100 in accordance with the teachings of the present disclosure. As illustrated, the representative regulator 100 is coupled to a DC power supply 105, such as a battery, and to one or more LEDs 140 which, when energized as discussed below, emit light in the visible spectrum. In accordance with the present disclosure, the LEDs 140 may be energized in any of a plurality of modes, such as in a flash mode, to provide a high-intensity lighting pulse of comparatively short duration (such as for use as a flash for a camera or other portable device), in a constant (flashlight or "torch") mode, such as for providing comparatively lower-intensity, background lighting for comparatively longer durations, or in other modes, such as for providing lighting of any selected intensity and duration. For a flash mode, for example, the regulator 100 may generate a pulse of 4-5 msec to power LEDs 140 with a comparatively high current to provide comparatively high brightness. Also, the regulator 100 (and 300, below) provides such current regulation in an open loop system, using stored parameter values, without requiring the feedback and significant number of components of prior art current regulators. Not separately illustrated in FIG. 1 are common components for digital logic circuits, such as clocking or oscillation circuits.

The representative regulator 100 comprises a controller $310_A$, filter capacitors 135 and 165, inductor 145, and diode (or rectifier) 170. The controller $310_A$, illustrated as a selected instantiation of a controller 310 (of FIG. 4), comprises a control circuit (i.e., digital logic block) 110, a memory 180, comparators (a first comparator 115 and a second comparator 120), a "driving" switch 125 (typically implemented utilizing a transistor, such as the illustrated MOSFET) (which also may be operated via a buffer 130 or other driving circuit), a current sensor 150 (typically implemented as a resistor, as illustrated), and a voltage sensor 185 (typically implemented as a voltage divider (resistors 155, 160) as illustrated). Depending upon the implementation, a digital-to-analog (D/A) converter 175 may also be utilized, for example, to provide a first predetermined reference voltage level ("$V_{REF}$"). As discussed in greater detail below, the control circuit 110 typically includes two counters, a first cycle time (T) counter 195 and a second reset time ($T_R$) counter 190. The control circuit 110 may be implemented utilizing any type of digital logic, such as a finite state machine, a controller, a processor, or any other arrangement of gates which performs the functionality discussed below.

The representative regulator 100 provides control over the brightness of the output of the LEDs 140 for a selected mode, such as for high-intensity flash mode or lower-intensity constant or background mode, by controlling the average current level through the LEDs 140, also as discussed below. Under the control of the control circuit 110, when the switch 125 is in an on-state and conducting (time interval "$T_{ON}$," illustrated in FIG. 2C), current will flow into the inductor 145 from the DC power supply (battery) 105. The current sensor 150 senses the current level through the switch 125, and compares a corresponding voltage level "$V_C$" (e.g., across the illustrated resistor) to the first predetermined reference voltage level ($V_{REF}$). When the inductor current has reached a predetermined peak level ("$I_P$"), based upon the comparison of $V_C$ to $V_{REF}$ in first comparator 115, the control circuit 110 will turn the switch 125 off (into an off or non-conducting state, for a duration of time interval "$T_{OFF}$," illustrated in FIG. 2B), and current will flow to and energize the LEDs 140 (via diode 170), providing light output of the desired intensity and duration. It should be noted that the first predetermined reference voltage level ($V_{REF}$) and the second predetermined reference voltage level (illustrated as $V_{IN}$, as an example) may be any suitable voltage levels, may be determined based upon desired current levels and resistance values (such as for resistors which may be utilized to implement current sensor 150 and voltage sensor 185), and further may be selectable by the control circuit 110 from a plurality of reference voltage levels (e.g., corresponding to a plurality of average current parameters "a," peak current parameters "$I_P$," and average output DC current parameters "$I_O$," discussed below).

As mentioned above, the desired output brightness intensity levels are provided through the control of the average current level (through the inductor 145 and/or LEDs 140, equivalently) by the representative regulator 100. In accordance with the disclosure, this average output DC current ("$I_O$") is calculated as (Equation 1):

$$I_O = \frac{I_P \cdot T_R}{2T}$$

Figure 2A:
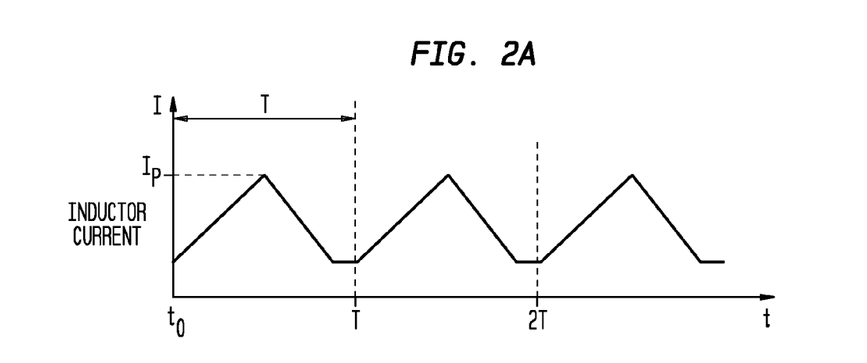
FIGS. 2A, 2B, and 2C are graphical diagrams of current levels for a representative current regulator (or converter) in accordance with the teachings of the present disclosure.
Figure 2B:
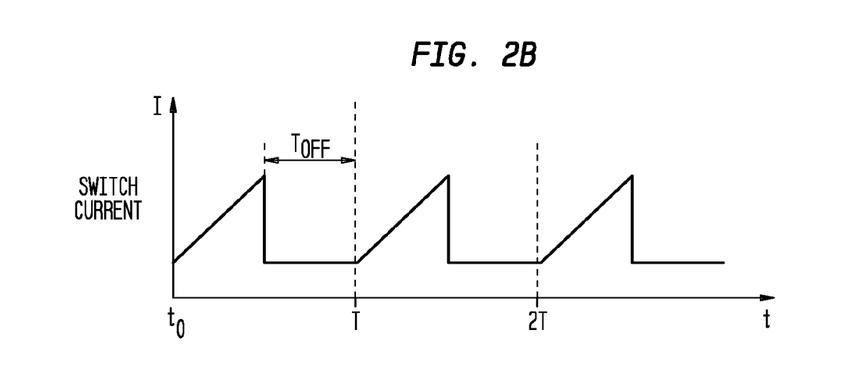
Figure 2C:
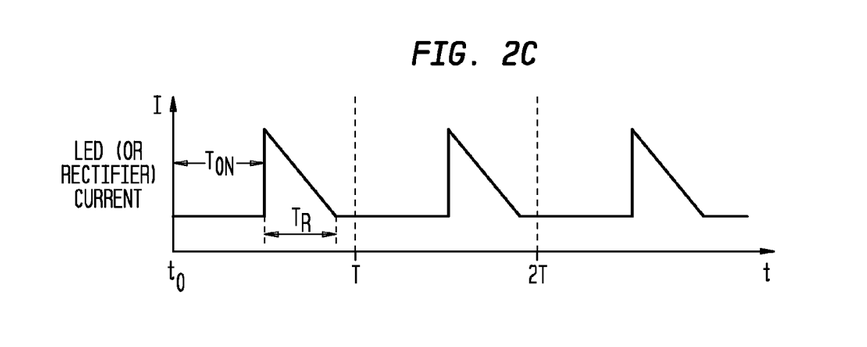

(or, with substantial rather than exact equality $$I_O \approx \frac{I_P \cdot T_R}{2T},$$

or more generally with proportionality $$I_O \propto \frac{I_P \cdot T_R}{2T}),$$

where "$I_P$" is the peak current through the inductor 145, "$T_R$" is the "reset" time (the time interval, subsequent to reaching the peak current, for the current through the inductor 145 to become substantially equal to zero), and "T" is the energizing cycle time (the period (time interval) for each cycle of energizing the LEDs 140, namely, the interval between successive switching of the switch 125 into an on-state), as illustrated in FIGS. 2A, 2B, and 2C.

FIGS. 2A, 2B, and 2C, is a graphical diagram of current levels for a representative current regulator (or converter) in accordance with the teachings of the present disclosure. As illustrated in FIG. 2A, when the switch 125 is switched on and conducting (t=$t_0$), the inductor 145 current increases to the peak current $I_P$ during the $T_{ON}$ interval, then decreases to substantially zero during the reset time interval $T_R$, and will again increase beginning with the next and successive energizing cycles (t=T, 2T, etc.). Correspondingly, FIG. 2B illustrates the current flow through the switch 125 during the $T_{ON}$ interval, and FIG. 2C illustrates the current flow through the rectifier (diode) 170 during the $T_{OFF}$ interval, which is essentially equivalent to the current flow through the LEDs 140 during this interval. (The illustrated current levels are idealized to convey the concepts of the present disclosure, and that actual current levels found in the practice of the disclosure will deviate from those illustrated.)

In accordance with the disclosure, the average output DC current ($I_O$) and peak inductor current ($I_P$) are predetermined values, based on the selected operating mode and desired brightness levels for the selected LEDs 140. For example, corresponding values or parameters, of a plurality of values or parameters for the average output DC current ($I_O$) and peak inductor current ($I_P$), are selected or predetermined for each of the various operating modes, such as flash mode, background mode, torch or flashlight mode, and so on. A predetermined "average current level" parameter "a" is then determined as proportional to the ratio of the peak inductor current level ($I_P$) to the average output DC current level ($I_O$), and more particularly proportional to one-half of the ratio of the peak inductor current level ($I_P$) to the average output DC current level ($I_O$) (Equation 2):

$$\left(a \propto \frac{I_P}{2I_O}\right)$$

(or with substantial or exact equality as $$\left(a \approx \frac{I_P}{2I_O}\right)$$

or $$\left(a = \frac{I_P}{2I_O}\right),$$

respectively), and corresponds to the desired average output DC current level ($I_O$) for the selected peak inductor current level ($I_P$) for the selected operating mode. One or more predetermined parameters "a" are then stored in memory 180, corresponding to selected modes and brightness levels, such as brightness levels for flash mode and brightness levels for a constant (or background) lighting mode. When embodied in a device such as a digital camera or mobile telephone, the user may then select the lighting mode, and the corresponding average current level parameter "a" is then utilized by the current regulator (or converter) 100 (and 300, discussed below) to provide the selected lighting (i.e., operating) mode of a plurality of available operating or lighting modes.

To provide the desired average output DC current level ($I_O$), in accordance with the present disclosure, the energizing cycle time T is modulated (or varied), providing current regulation according to the relation (Equation 3):

$$T \propto a \cdot T_R.$$

Current regulation may also be provided more precisely, using substantial or exact equality, as $T \approx a \cdot T_R$ or $T = a \cdot T_R$, respectively. Also in accordance with the disclosure, the reset time $T_R$ is determined empirically, i.e., measured by regulator 100 (300) and the cycle time T is adjusted accordingly based on Equation 3, using a variable cycle time "$T_n$" for the current cycle "n."

Figure 3:
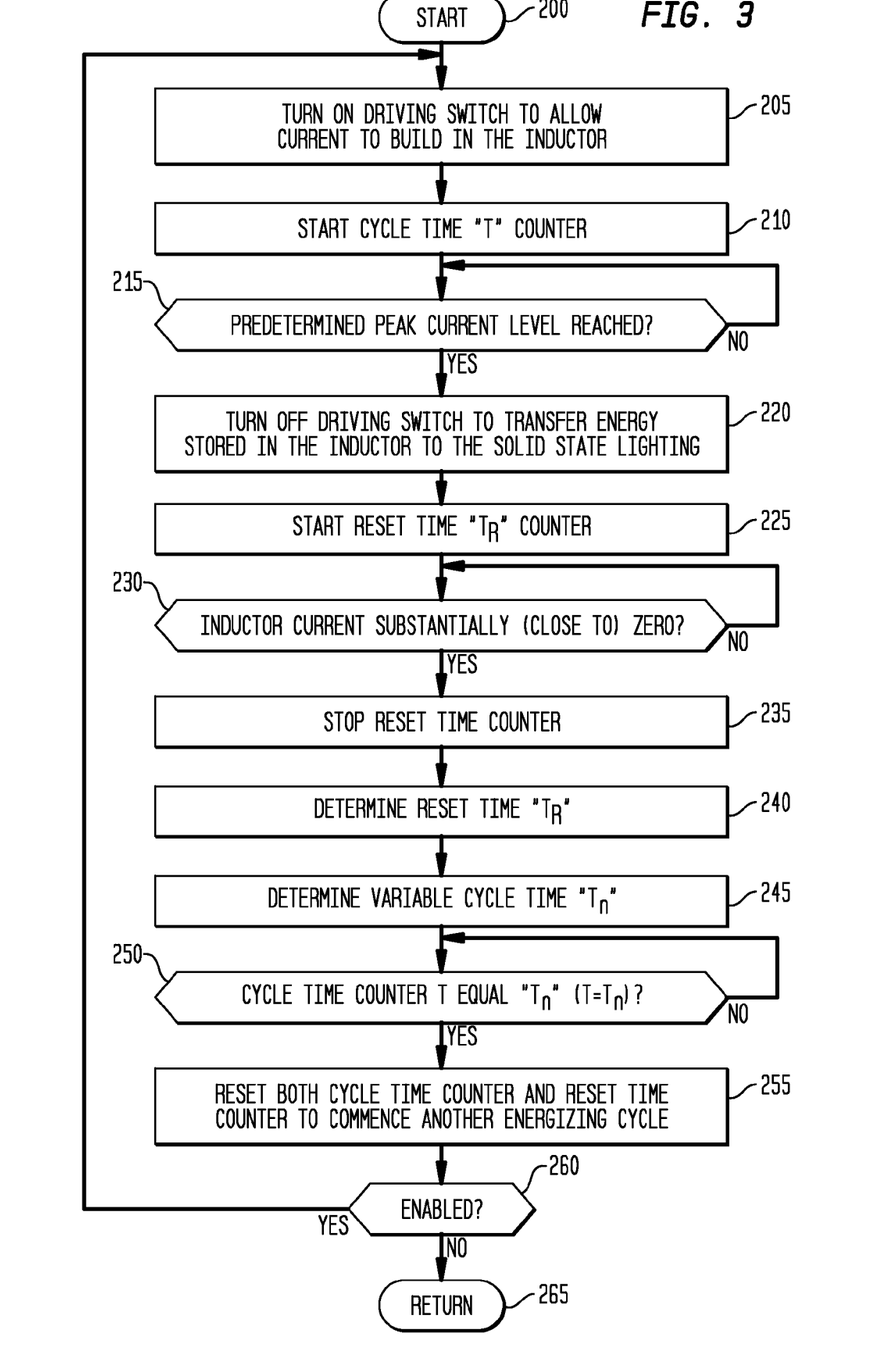
FIG. 3 is a flow chart diagram of a representative method embodiment for current regulation in accordance with the teachings of the present disclosure.

FIG. 3 is a flow chart diagram of a representative method embodiment for current regulation in accordance with the teachings of the present disclosure. Beginning with start step 200, such as when a flash mode is enabled in a digital camera and a photograph is being taken, the driving switch 125 is turned on, step 205, and the first counter (cycle time T counter) 195 is started, step 210, both typically by and under the control of the control circuit 110 of a controller 310$_A$, 310. The switch 125 is maintained in an on state until the predetermined peak inductor current level $I_P$ is reached, step 215. As mentioned above, the determination of whether the peak inductor current level $I_P$ has been reached is based on comparing a corresponding first voltage level $V_C$ from current sensor (or resistor) 150 to a first predetermined reference voltage level $V_{REF}$, using first comparator 115. When the predetermined peak inductor current level $I_P$ is reached in step 215, the driving switch 125 is turned off, step 220, and the second counter (reset time $T_R$ counter) 190 is started, step 225, also both typically by and under the control of the control circuit 110 of a controller 310$_A$, 310. Steps 220 and 225 may be performed concurrently, or close to concurrently. As illustrated in FIG. 2A, the inductor current level then begins to decrease (to a level substantially close to zero), and may be measured using a corresponding second voltage level generated across voltage divider 185, such as by detecting a change in voltage as the magnetic field in the inductor 145 collapses. The corresponding second voltage level is then compared (in second comparator 120) to a second predetermined reference voltage level, such as $V_{IN}$ provided by the DC power supply (battery) 105, as illustrated in FIG. 1, and the comparison is utilized to determine the reset time $T_R$.

Referring again to FIG. 3, when the inductor current level is substantially close to or equal to zero in step 230, the second counter (reset time $T_R$ counter) 190 is stopped, step 235, and the reset time $T_R$ is calculated, step 240, also both typically by the control circuit 110 of a controller 310A, 310. Then, using the predetermined "average current level" parameter "a" and the reset time $T_R$, the variable cycle time $T_n$ is determined, step 245. In representative embodiments, both the reset time $T_R$ and the variable cycle time $T_n$ are determined as numerical counts corresponding to their respective time intervals. Also in the representative embodiments, the variable cycle time $T_n$ is determined by the control circuit using Equation 3, namely: $T_n = a \cdot T_R$ (step 245). Next, when the count value of the first counter (cycle time T counter) 195 is equal to the variable cycle time $T_n$ in step 250, the first and second counters 195, 190 are reset, and when enabled, step 260, the method continues and a new cycle starts, returning to step 205 to turn on the driving switch for another cycle of energizing the LEDs 140. When no longer enabled in step 260, the method may end, return step 265.

The representative embodiments of the disclosure provide digital control over the desired average output DC current level ($I_O$), based on the selected operating mode and desired brightness levels for the selected LEDs 140, by modulating the cycle time T of the energizing of the LEDs 140. Stated another equivalent way, for a selected peak inductor current level ($I_P$) and desired average output DC current level ($I_O$), given that the reset time $T_R$ is dependent upon the inductance value of the inductor 145 and other operating parameters of the selected LEDs 140, and given that the on-time $T_{ON}$ of the switch 125 is also determined by the inductance value of the inductor 145 and the selected peak inductor current level ($I_P$), the present disclosure effectively varies the off-time of the switch 125 to provide control over the average output DC current level ($I_O$) provided to the LEDs 140, and corresponding light output for the selected operating mode.

In addition, the representative embodiments allow current to be sourced independently of the impedance, i.e., independently of the number of diodes comprising LEDs 140. This current regulation is also provided in an open-loop system, without requiring measurement of the current levels through the LEDs 140, thereby eliminating corresponding power losses, and extending battery life (particularly valuable for portable applications, such as for cameras, mobile telephones, notebook computers, and personal digital assistants).

Figure 4:
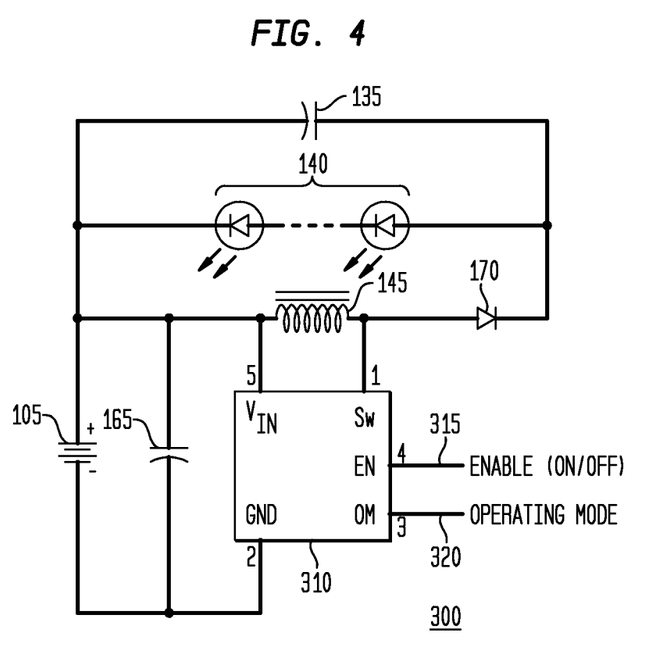
FIG. 4 is a circuit and block diagram of a representative second embodiment of a current regulator (or converter) in accordance with the teachings of the present disclosure.

FIG. 4 is a circuit and block diagram of a representative second embodiment of a current regulator (or converter) 300 in accordance with the teachings of the present disclosure. The current regulator 300 operates as previously discussed with respect to regulator 100. As illustrated in FIG. 4, a controller 310 is utilized to provide the control, measurements, counts, and calculations discussed above, with the illustrated pin connections 1, 2, 3, 4, and 5 to the balance of the current regulating circuit, with controller 310$_A$ of FIG. 1 being a selected embodiment or instantiation of controller 310. User inputs are provided to the controller 310 for the user to select the desired operating mode, illustrated as an enable input (on/off) 315, and an operating mode input 320, such as for selection of flash or constant lighting modes.

Figure 5:
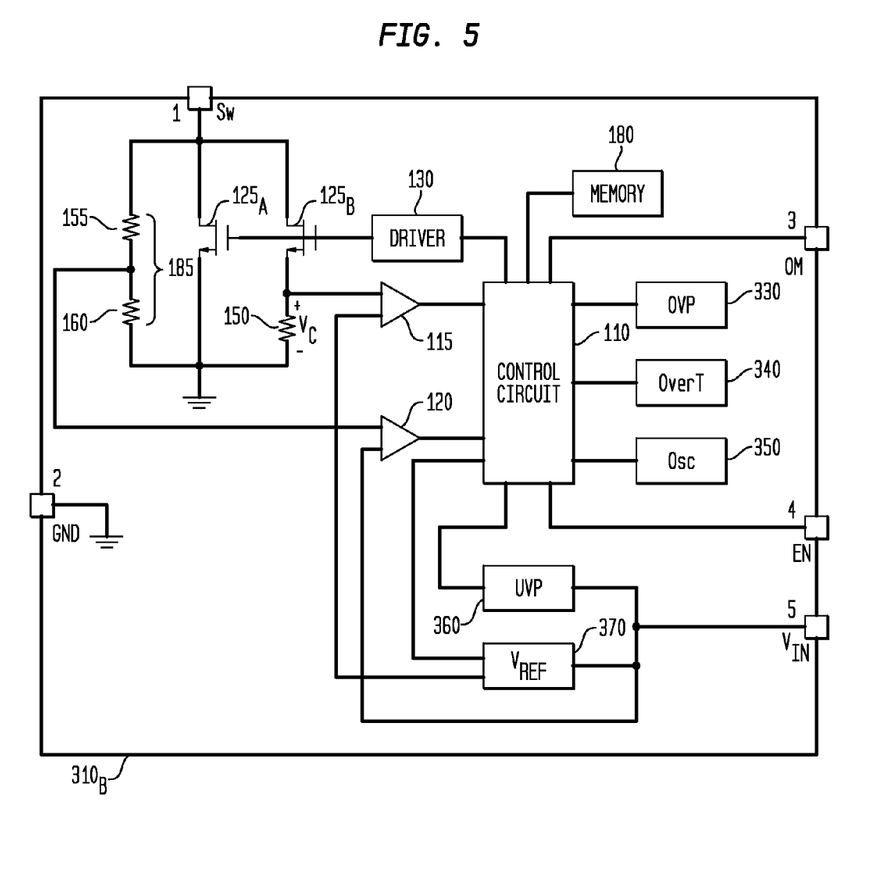
FIG. 5 is a circuit and block diagram of a representative controller utilized for a current regulator (or converter) in accordance with the teachings of the present disclosure.

FIG. 5 is a circuit and block diagram of a representative controller 310$_B$ utilized for a current regulator (or converter) 100, 300 in accordance with the teachings of the present disclosure, and operates to provide current regulation as previously discussed. In this representative embodiment, controller 310$_B$ also includes additional, desirable features for embodiment within various devices, such as within cameras and mobile telephones, for example. As illustrated in FIG. 5, switch 125 is implemented utilizing two MOSFET transistors 125$_A$ and 125$_B$. A first predetermined voltage reference $V_{REF}$ is generated in block 370, and may be implemented as a voltage divider, for example, and may be selectable by the control circuit 110, such as to set different reference voltage levels to correspond to a selected operating mode. The second predetermined reference voltage level also utilizes $V_{IN}$, as illustrated, although other reference voltage levels may be utilized equivalently. Over-voltage and over-temperature protection are provided in blocks 330 and 340, respectively, while an input clock signal is provided by oscillator 350. Under-voltage protection is provided in block 360, which monitors the voltage ($V_{IN}$) provided by the DC power supply (e.g., battery) 105 and if too low, is adapted to turn off the apparatus 100, 300 to avoid depleting or ruining the battery. The illustrated memory 180 may include stored values for the average current parameters "a," or may include means (not separately illustrated) to supply such values from external source.

Numerous advantages of the present disclosure for providing power to solid state lighting, such as light-emitting diodes, are readily apparent. The representative embodiments allow multiple modes of operation, such as for providing power to LEDs utilized for flash or background lighting in cameras and other portable devices. The representative current regulator embodiments provide digital control, without requiring external compensation. The representative current regulator embodiments also utilize comparatively fewer components, providing reduced cost and size, while simultaneously providing increased efficiency and enabling longer battery life when used in portable devices.

Although the disclosure has been described with respect to specific embodiments thereof, these embodiments are merely illustrative and not restrictive of the disclosure. In the description herein, numerous specific details are provided, such as examples of electronic components, electronic and structural connections, materials, and structural variations, to provide a thorough understanding of embodiments of the present disclosure. An embodiment of the disclosure can be practiced without one or more of the specific details, or with other apparatus, systems, assemblies, components, materials, parts, etc. In other instances, well-known structures, materials, or operations are not specifically shown or described in detail to avoid obscuring aspects of embodiments of the present disclosure. In addition, the various figures are not drawn to scale and should not be regarded as limiting.

Reference throughout this specification to "one embodiment," "an embodiment," or a specific "embodiment" means that a particular feature, structure, or characteristic described in connection with the embodiment is included in at least one embodiment of the present disclosure and not necessarily in all embodiments, and further, are not necessarily referring to the same embodiment. Furthermore, the particular features, structures, or characteristics of any specific embodiment of the present disclosure may be combined in any suitable manner and in any suitable combination with one or more other embodiments, including the use of selected features without corresponding use of other features. In addition, many modifications may be made to adapt a particular application, situation, or material to the essential scope and spirit of the claimed subject matter. It is to be understood that other variations and modifications of the embodiments of the present disclosure described and illustrated herein are possible in light of the teachings herein and are to be considered part of the spirit and scope of the claimed subject matter.

It will also be appreciated that one or more of the elements depicted in the figures can also be implemented in a more separate or integrated manner, or even removed or rendered inoperable in certain cases, as may be useful in accordance with a particular application. Integrally formed combinations of components are also within the scope of the disclosure, particularly for embodiments in which a separation or combination of discrete components is unclear or indiscernible. In addition, use of the term "coupled" herein, including in its various forms such as "coupling" or "couplable," means and includes any direct or indirect electrical, structural or magnetic coupling, connection or attachment, or adaptation or capability for such a direct or indirect electrical, structural or magnetic coupling, connection or attachment, including integrally formed components and components which are coupled via or through another component.

As used herein for purposes of the present disclosure, the term "LED" and its plural form "LEDs" should be understood to include any electroluminescent diode or other type of carrier injection- or junction-based system which is capable of generating radiation in response to an electrical signal, including without limitation, various semiconductor- or carbon-based structures which emit light in response to a current or voltage, light-emitting polymers, organic LEDs, and so on, including within the visible spectrum, or other spectra such as ultraviolet or infrared, of any bandwidth, or of any color or color temperature.

A "controller" or "processor" 110, 310 may be any type of controller or processor, and may be embodied as one or more controllers 110, 310, adapted to perform the functionality discussed herein. As the term controller or processor is used herein, a controller 110, 310 may include use of a single integrated circuit ("IC"), or may include use of a plurality of integrated circuits or other components connected, arranged, or grouped together, such as controllers, microprocessors, digital signal processors ("DSPs"), parallel processors, multiple core processors, custom ICs, application-specific integrated circuits ("ASICs"), field programmable gate arrays ("FPGAs"), adaptive computing ICs, associated memory (such as RAM, DRAM and ROM), and other ICs and components. As a consequence, as used herein, the term controller (or processor) should be understood to equivalently mean and include a single IC, or arrangement of custom ICs, ASICs, processors, microprocessors, controllers, FPGAs, adaptive computing ICs, or some other grouping of integrated circuits which perform the functions discussed below, with associated memory, such as microprocessor memory or additional RAM, DRAM, SDRAM, SRAM, MRAM, ROM, FLASH, EPROM or E$^2$PROM. A controller (or processor) (such as controller 110, 310), with its associated memory, may be adapted or configured (via programming, FPGA interconnection, or hard-wiring) to perform the methodology of the disclosure, as discussed below. For example, the methodology may be programmed and stored, in a controller 110, 310 with its associated memory (and/or memory 180) and other equivalent components, as a set of program instructions or other code (or equivalent configuration or other program) for subsequent execution when the processor is operative (i.e., powered on and functioning). Equivalently, when the controller 110, 310 may implemented in whole or part as FPGAs, custom ICs, and/or ASICs, the FPGAs, custom ICs, or ASICs also may be designed, configured and/or hard-wired to implement the methodology of the disclosure. For example, the controller 110, 310 may be implemented as an arrangement of controllers, microprocessors, DSPs and/or ASICs, collectively referred to as a "controller," which are respectively programmed, designed, adapted or configured to implement the methodology of the disclosure, in conjunction with a memory 180.

The memory 180, which may include a data repository (or database), may be embodied in any number of forms, including within any computer or other machine-readable data storage medium, memory device, or other storage or communication device for storage or communication of information, currently known or which becomes available in the future, including, but not limited to, a memory integrated circuit ("IC"), or memory portion of an integrated circuit (such as the resident memory within a controller 110, 310 or processor IC), whether volatile or non-volatile, whether removable or non-removable, including without limitation RAM, FLASH, DRAM, SDRAM, SRAM, MRAM, FeRAM, ROM, EPROM or $E^2$PROM, or any other form of memory device, such as a magnetic hard drive, an optical drive, a magnetic disk or tape drive, a hard disk drive, other machine-readable storage or memory media such as a floppy disk, a CDROM, a CD-RW, digital versatile disk (DVD) or other optical memory, or any other type of memory, storage medium, or data storage apparatus or circuit, which is known or which becomes known, depending upon the selected embodiment. In addition, such computer-readable media includes any form of communication media which embodies computer-readable instructions, data structures, program modules or other data in a data signal or modulated signal, such as an electromagnetic or optical carrier wave or other transport mechanism, including any information delivery media, which may encode data or other information in a signal, wired or wirelessly, including electromagnetic, optical, acoustic, RF or infrared signals, and so on. The memory 180 may be adapted to store various look-up tables, parameters, coefficients, other information and data, programs or instructions (of the software of the present disclosure), and other types of tables such as database tables.

As indicated above, the controller 110, 310 is programmed, using software and data structures of the disclosure, for example, to perform the methodology of the present disclosure. As a consequence, the system and method of the present disclosure may be embodied as software which provides such programming or other instructions, such as a set of instructions and/or metadata embodied within a computer-readable medium, discussed above. In addition, metadata may also be utilized to define the various data structures of a look-up table or a database. Such software may be in the form of source or object code, by way of example and without limitation. Source code further may be compiled into some form of instructions or object code (including assembly language instructions or configuration information). The software, source code or metadata of the present disclosure may be embodied as any type of code, such as C, C++, SystemC, LISA, XML, Java, Brew, SQL and its variations (e.g., SQL 99 or proprietary versions of SQL), DB2, Oracle, or any other type of programming language which performs the functionality discussed herein, including various hardware definition or hardware modeling languages (e.g., Verilog, VHDL, RTL) and resulting database files (e.g., GDSII). As a consequence, a "construct," "program construct," "software construct," or "software," as used equivalently herein, means and refers to any programming language, of any kind, with any syntax or signatures, which provides or can be interpreted to provide the associated functionality or methodology specified (when instantiated or loaded into a processor or computer and executed, including the controller 310, for example).

The software, metadata, or other source code of the present disclosure and any resulting bit file (object code, database, or look-up table) may be embodied within any tangible storage medium, such as any of the computer or other machine-readable data storage media, as computer-readable instructions, data structures, program modules or other data, such as discussed above with respect to the memory 180, e.g., a floppy disk, a CDROM, a CD-RW, a DVD, a magnetic hard drive, an optical drive, or any other type of data storage apparatus or medium, as mentioned above.

Furthermore, any signal arrows in the drawings/figures should be considered only representative, and not limiting, unless otherwise specifically noted. Combinations of components of steps will also be considered within the scope of the present disclosure, particularly where the ability to separate or combine is unclear or foreseeable. The disjunctive term "or," as used herein and throughout the claims that follow, is generally intended to mean "and/or," having both conjunctive and disjunctive meanings (and is not confined to an "exclusive or" meaning), unless otherwise indicated. As used in the description herein and throughout the claims that follow, "a," "an," and "the" include plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present disclosure, including what is described in the summary or in the abstract, is not intended to be exhaustive or to limit the disclosure to the precise forms disclosed herein. From the foregoing, it will be observed that numerous variations, modifications and substitutions are intended and may be effected without departing from the spirit and scope of the claimed subject matter. It is to be understood that no limitation with respect to the specific methods and apparatus illustrated herein is intended or should be inferred. It is, of course, intended to cover by the appended claims all such modifications as fall within the scope of the claims.

It is claimed:

1. A current regulator configured to provide a plurality of operating modes for solid state lighting, the current regulator couplable to a DC power supply, the current regulator comprising:
a memory configured to store a plurality of average current parameters; and
a control circuit coupled to the memory, wherein the control circuit is configured to modulate an energizing cycle time period, and wherein the control circuit is further configured to provide power to the solid state lighting in response to a selected average current parameter from the plurality of average current parameters.

2. The current regulator of claim 1, wherein each average current parameter from the plurality of average current parameters corresponds to a selected operating mode from the plurality of operating modes.

3. The current regulator of claim 1, wherein the plurality of operating modes comprises a flash mode and a constant mode.

4. The current regulator of claim 1, wherein the control circuit is further configured to determine the energizing cycle time period ("T") as proportional to a product of the selected average current parameter ("a") and a reset time period ("$T_R$") for an inductor current to return to a substantially zero level from a predetermined peak level (T∝a·$T_R$).

5. The current regulator of claim 4, wherein each average current parameter ("a") from the plurality of average current parameters is predetermined as substantially equal to one-half of a ratio of a peak inductor current level ("$I_P$") to an average output DC current level ("$I_O$")

$$\left(a \approx \frac{I_P}{2I_O}\right).$$

6. The current regulator of claim 4, wherein each average current parameter ("a") from the plurality of average current parameters is predetermined as substantially proportional to a ratio of a peak inductor current level ("$I_P$") to an average output DC current level ("$I_O$")

$$\left(a \propto \frac{I_P}{I_O}\right).$$

7. The current regulator of claim 6, wherein the peak inductor current level ($I_P$) and the average output DC current level ($I_O$) are predetermined and correspond to the selected operating mode from the plurality of operating modes.

8. The current regulator of claim 4, wherein the control circuit comprises:
a first counter configured to provide a count corresponding to the energizing cycle time period ($T_n$); and
a second counter configured to provide a count corresponding to the reset time period ($T_R$).

9. The current regulator of claim 8, wherein the control circuit is further configured to provide a next energizing cycle when a count ($T_n$) of the first counter is equal to the energizing cycle time period (T).

10. The current regulator of claim 1, further comprising:
an inductor coupled to both the DC power supply and the solid state lighting;
a switch coupled to both the inductor and the control circuit;
a current sensor coupled to the switch; and
a first comparator coupled to both the current sensor and the control circuit, wherein the control circuit is further configured to turn the switch on to commence an energizing cycle and to turn the switch off when the first comparator indicates that an inductor current has reached a predetermined peak level.

11. The current regulator of claim 10, further comprising:
a voltage sensor; and
a second comparator coupled to both the voltage sensor and the control circuit, wherein the control circuit is further configured to determine the reset time period ($T_R$) when the second comparator indicates that a voltage level corresponding to the inductor current has decreased substantially to a zero level.

12. A method of providing power to a solid state lighting system for a selected operating mode from a plurality of operating modes, the method comprising:
starting an energizing cycle by providing current through an inductor until a predetermined peak inductor current level is reached;
transferring energy stored in the inductor to the solid state lighting system;
determining a reset time period as a time duration for the inductor current to decrease substantially to a zero level from the peak inductor current level;
determining an energizing cycle time period based on the reset time period and a predetermined average current parameter; and
commencing a next energizing cycle when the energizing cycle time period has elapsed.

13. The method of claim 12, wherein the predetermined average current parameter corresponds to the selected operating mode from the plurality of operating modes.

14. The method of claim 12, wherein the plurality of operating modes comprises a flash mode and a constant mode.

15. The method of claim 12, wherein said determining an energizing cycle time period further comprises determining the energizing cycle time period ("T") as proportional to a product of the predetermined average current parameter ("a") and a reset time period ("$T_R$") for an inductor current to return to a substantially zero level from a predetermined peak level (T∝a·$T_R$).

16. The method of claim 15, further comprising determining the predetermined average current parameter ("a") as substantially equal to one-half of a ratio of a peak inductor current level ("$I_P$") to an average output DC current level ("$I_O$")

$$\left(a \approx \frac{I_P}{2I_O}\right).$$

17. The method of claim 15, further comprising determining the predetermined average current parameter ("a") as substantially proportional to a ratio of a peak inductor current level ("$I_P$") to an average output DC current level ("$I_O$")

$$\left(a \propto \frac{I_P}{I_O}\right).$$

18. The method of claim 17, wherein the peak inductor current level ($I_P$) and the average output DC current level ($I_O$) are predetermined and correspond to the selected operating mode from the plurality of operating modes.

19. The method of claim 17, further comprising:
selecting the predetermined average current parameter from a plurality of predetermined average current parameters, wherein each predetermined average current parameter corresponds to the selected operating mode from the plurality of operating modes; and
determining each predetermined average current parameter based, at least in part, on a corresponding peak inductor current level ($I_P$) from a plurality of peak inductor current levels ($I_P$) and an average output DC current level ($I_O$) from a plurality of average output DC current levels ($I_O$).

20. The method of claim 12, further comprising:
providing a first count corresponding to the energizing cycle time period; and
providing a second count corresponding to the reset time period.

21. The method of claim 20, wherein the next energizing cycle is commenced when the first count is equal to the energizing cycle time period.

22. An apparatus configured to provide a plurality of operating modes for solid state lighting, the apparatus comprising:
a memory configured to store a plurality of average current parameters; and
a controller coupled to the memory, wherein the controller is configured to modulate an energizing cycle time period, and wherein the controller is further configured to provide power to the solid state lighting in response to a selected average current parameter from the plurality of average current parameters.

23. The apparatus of claim 22, wherein each average current parameter from the plurality of average current parameters corresponds to a selected operating mode from the plurality of operating modes.

24. The apparatus of claim 22, wherein the plurality of operating modes comprises a flash mode and a constant mode.

25. The apparatus of claim 22, wherein the controller is further configured to determine the energizing cycle time period ("T") as proportional to a product of the selected average current parameter ("a") and a reset time period ("$T_R$") for an inductor current to return to a substantially zero level from a predetermined peak level ($T \propto a \cdot T_R$).

26. The apparatus of claim 25, wherein each average current parameter ("a") from the plurality of average current parameters is predetermined as substantially equal to one-half of a ratio of a peak inductor current level ("$I_P$") to an average output DC current level ("$I_O$")

$$\left(a \propto \frac{I_P}{2I_O}\right).$$

27. The apparatus of claim 25, wherein each average current parameter ("a") from the plurality of average current parameters is predetermined as substantially proportional to a ratio of a peak inductor current level ("$I_P$") to an average output DC current level ("$I_O$")

$$\left(a \propto \frac{I_P}{I_O}\right).$$

28. The apparatus of claim 27, wherein the peak inductor current level ($I_P$) and the average output DC current level ($I_O$) are predetermined and correspond to the selected operating mode from the plurality of operating modes.

29. The apparatus of claim 27, wherein each predetermined average current parameter is determined by a corresponding peak inductor current level ($I_P$) from a plurality of peak inductor current levels ($I_P$) and an average output DC current level ($I_O$) from a plurality of average output DC current levels ($I_O$).

30. The apparatus of claim 25, wherein the controller comprises:
a first counter configured to provide a count corresponding to the energizing cycle time period ($T_n$); and
a second counter configured to provide a count corresponding to the reset time period ($T_R$).

31. The apparatus of claim 30, wherein the controller is further configured to provide a next energizing cycle when a count ($T_n$) of the first counter is equal to the energizing cycle time period (T).

32. The apparatus of claim 22, further comprising:
an inductor coupled to both the DC power supply and the solid state lighting;
wherein the controller comprises:
a control circuit;
a switch coupled to both the inductor and the control circuit;
a current sensor coupled to the switch; and
a first comparator coupled to both the current sensor and the control circuit, wherein the control circuit is configured to turn the switch on to commence an energizing cycle and to turn the switch off when the first comparator indicates that an inductor current has reached a predetermined peak level.

33. The apparatus of claim 32, wherein the controller further comprises:
a voltage sensor; and
a second comparator coupled to both the voltage sensor and the control circuit, wherein the control circuit is further configured to determine the reset time period ($T_R$) when the second comparator indicates that a voltage level corresponding to the inductor current has decreased substantially to a zero level.

34. A non-transitory computer-readable storage medium having instructions stored thereon that, in response to execution by a computing device, cause the computing device to:
start an energizing cycle by providing current through an inductor until a predetermined peak inductor current level is reached;
transfer energy stored in the inductor to a solid state lighting system;
determine a reset time period as a time duration for the inductor current to decrease substantially to a zero level from the peak inductor current level;
determine an energizing cycle time period based on the reset time period and a predetermined average current parameter; and
commence a next energizing cycle when the energizing cycle time period has elapsed.

35. The non-transitory computer-readable storage medium of claim 34, further comprising instructions that, in response to execution by the computing device, cause the computing device to determine the energizing cycle time period ("T") as proportional to a product of the predetermined average current parameter ("a") and a reset time period ("$T_R$") for an inductor current to return to a substantially zero level from a predetermined peak level ($T \propto a \cdot T_R$).

36. The non-transitory computer-readable storage medium of claim 35, further comprising instructions that, in response to execution by the computing device, cause the computing device to determine the predetermined average current parameter ("a") as substantially equal to one-half of a ratio of a peak inductor current level ("$I_P$") to an average output DC current level ("$I_O$")

$$\left(a \approx \frac{I_P}{2I_O}\right).$$

37. The non-transitory computer-readable storage medium of claim 35, further comprising instructions that, in response to execution by the computing device, cause the computing device to determine the predetermined average current parameter ("a") as substantially proportional to a ratio of a peak inductor current level ("$I_P$") to an average output DC current level ("$I_O$")

$$\left(a \propto \frac{I_P}{I_O}\right).$$

38. The non-transitory computer-readable storage medium of claim 37, further comprising instructions that, in response to execution by the computing device, cause the computing device to:
  select the predetermined average current parameter from a plurality of predetermined average current parameters, wherein each predetermined average current parameter corresponds to a selected operating mode from a plurality of operating modes; and
  determine each predetermined average current parameter by a corresponding peak inductor current level ($I_P$) from a plurality of peak inductor current levels ($I_P$) and an average output DC current level ($I_O$) from a plurality of average output DC current levels ($I_O$).

39. The non-transitory computer-readable storage medium of claim 34, further comprising instructions that, in response to execution by the computing device, cause the computing device to:
  provide a first count corresponding to the energizing cycle time period; and
  provide a second count corresponding to the reset time period.

40. The non-transitory computer-readable storage medium of claim 39, further comprising instructions that, in response to execution by the computing device, cause the computing device to commence the next energizing cycle when the first count is equal to the energizing cycle time period.

* * * * *